United States Patent
Hara et al.

(10) Patent No.: US 11,338,826 B2
(45) Date of Patent: May 24, 2022

(54) PARKING ASSIST SYSTEM

(71) Applicant: HONDA MOTOR CO., LTD., Tokyo (JP)

(72) Inventors: Yuki Hara, Saitama (JP); Yasushi Shoda, Saitama (JP); Hiroshi Yamanaka, Saitama (JP); Masaaki Kawano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 16/907,757

(22) Filed: Jun. 22, 2020

(65) Prior Publication Data
US 2020/0398866 A1 Dec. 24, 2020

(30) Foreign Application Priority Data

Jun. 24, 2019 (JP) .............................. JP2019-116689
Dec. 13, 2019 (JP) .............................. JP2019-225928

(51) Int. Cl.
*B60W 60/00* (2020.01)
*B60W 30/06* (2006.01)
(Continued)

(52) U.S. Cl.
CPC ........ *B60W 60/0025* (2020.02); *B60W 10/04* (2013.01); *B60W 10/10* (2013.01);
(Continued)

(58) Field of Classification Search
CPC .. B60W 60/0025; B60W 10/04; B60W 10/10; B60W 10/18; B60W 10/20;
(Continued)

(56) References Cited

U.S. PATENT DOCUMENTS

2015/0367845 A1 12/2015 Sannodo et al.
2016/0272244 A1* 9/2016 Imai ....................... G08G 1/166
(Continued)

FOREIGN PATENT DOCUMENTS

JP 2007125981 A 5/2007
JP 2011152909 A 8/2011
(Continued)

OTHER PUBLICATIONS

Notice of Reasons for Refusal for Patent Application JP 2019-225928 dated Oct. 26, 2021; 8 pp.

*Primary Examiner* — Russell Frejd
*Assistant Examiner* — Ana D Thomas
(74) *Attorney, Agent, or Firm* — Armstrong Teasdale LLP

(57) ABSTRACT

A parking assist system includes: a control device configured to control a vehicle so as to move the vehicle autonomously from a current position to a target position; and an external environment sensor configured to detect an obstacle. During control of the vehicle to the target position, the control device is configured to recognize the obstacle present in a first area and a second area based on information from the external environment sensor. In a case where the control device recognizes the obstacle in the first area, the control device stops the vehicle, and in a case where the control device recognizes the obstacle in the second area and the obstacle in the second area is a moving object and/or a moving creature, the control device moves the vehicle in a decelerated state in which the vehicle is decelerated to a prescribed speed.

6 Claims, 8 Drawing Sheets

(51) Int. Cl.
*B60W 10/04* (2006.01)
*B60W 10/18* (2012.01)
*B60W 10/10* (2012.01)
*B60W 30/095* (2012.01)
*B60W 30/09* (2012.01)
*B60W 10/20* (2006.01)

(52) U.S. Cl.
CPC ............ *B60W 10/18* (2013.01); *B60W 10/20* (2013.01); *B60W 30/06* (2013.01); *B60W 30/09* (2013.01); *B60W 30/0956* (2013.01); *B60W 2540/10* (2013.01); *B60W 2540/12* (2013.01)

(58) Field of Classification Search
CPC .. B60W 30/06; B60W 30/09; B60W 30/0956; B60W 2540/10; B60W 2540/12; B60W 2540/215; B60W 2554/20; B60W 2720/10; B60W 2050/146; B60W 50/14
See application file for complete search history.

(56) References Cited

U.S. PATENT DOCUMENTS

2017/0361841 A1* 12/2017 Kojo ..................... B60W 30/16
2018/0093663 A1*  4/2018 Kim ....................... G08G 1/166

FOREIGN PATENT DOCUMENTS

| JP | 2016002957 A | 1/2016 |
| JP | 2018088060 A | 6/2018 |
| JP | 2018151962 A | 9/2018 |

* cited by examiner

PARKING ASSIST SYSTEM

TECHNICAL FIELD

The present invention relates to a parking assist system that moves a vehicle autonomously from a current position to a target position.

BACKGROUND ART

JP2007-125981A discloses a parking control device that suspends an automatic parking process when a moving obstacle is detected around a vehicle during the automatic parking process.

The moving obstacle around the vehicle does not necessarily collide with the vehicle. For example, in a case where a pedestrian stands slightly apart from a parking trajectory of the vehicle in order to wait for the automatic parking process to end or in a case where an animal notices the approach of the vehicle and thereby moves away from the vehicle, the pedestrian or the animal does not necessarily collide with the vehicle. If the vehicle is always stopped when such a moving obstacle is present around the vehicle, the automatic parking process takes time and the convenience of the driver is deteriorated since the driver has to perform an operation for resuming the automatic parking process or an operation for manual driving. On the other hand, if no measure is taken even though the moving obstacle is present around the vehicle, the safety around the vehicle may be deteriorated.

SUMMARY OF THE INVENTION

In view of such a problem of the prior art, a primary object of the present invention is to provide a parking assist system that can improve both the convenience of the driver and the safety around the vehicle without increasing the time required for the automatic parking process.

To achieve such an object, one embodiment of the present invention provides a parking assist system (1), including: a control device (15) configured to control a vehicle including a powertrain (4), a brake device (5), and a steering device (6) so as to move the vehicle autonomously from a current position to a target position; and an external environment sensor (7) configured to detect an obstacle present in a traveling direction of the vehicle, wherein during control of the vehicle to the target position, the control device is configured to recognize the obstacle present in a first area (51) and a second area (52) based on information from the external environment sensor, the first area being an area where a collision between the vehicle and the obstacle is possible, the second area being provided in a prescribed area outside the first area so as to be adjacent to at least one lateral edge of the first area and/or an edge of the first area at a side remote from the vehicle, in a case where the control device recognizes the obstacle in the first area, the control device stops the vehicle, and in a case where the control device recognizes the obstacle in the second area and the obstacle in the second area is a moving object and/or a moving creature, the control device moves the vehicle in a decelerated state in which the vehicle is decelerated to a prescribed speed.

According to this arrangement, the control device stops the vehicle on recognizing the obstacle in the first area and decelerates the vehicle on recognizing the prescribed obstacle in the second area. Thus, it is possible to improve both the convenience of the driver and the safety around the vehicle without increasing the time required for the automatic parking process.

Preferably, the parking assist system further includes a brake sensor (27) configured to detect a brake operation for driving the brake device by a driver, wherein in the decelerated state, when the control device determines that the brake operation by the driver is performed and then stopped based on information from the brake sensor, the control device cancels the decelerated state.

According to this arrangement, in a case where the brake operation by the driver is performed and then stopped, namely, in a case where it can be estimated that the driver judges that the risk caused by the obstacle is not present or avoided, the decelerated state is canceled. Thus, it is possible to suppress an increase in the time required to move the vehicle to the target position.

Preferably, the parking assist system further includes an accelerator sensor (28) configured to detect an acceleration operation for driving the powertrain by a driver, wherein in the decelerated state, when the control device determines that the acceleration operation by the driver is performed based on information from the accelerator sensor, the control device cancels the decelerated state.

According to this arrangement, in a case where the acceleration operation by the driver is performed, namely, in a case where it can be estimated that the driver judges that the risk caused by the obstacle is not present or avoided, the decelerated state is canceled. Thus, it is possible to suppress an increase in the time required to move the vehicle to the target position.

Preferably, the parking assist system further includes an input device (32) configured to receive an instruction from a driver, wherein while in the decelerated state, when the input device receives the instruction from the driver to cancel the decelerated state, the control device cancels the decelerated state.

According to this arrangement, the decelerated state can be canceled according to the intention of the driver, so that it is possible to improve the convenience of the driver and suppress an increase in the time required to move the vehicle to the target position.

Preferably, in the decelerated state in a case where a trajectory calculated by the control device includes a switching position for switching a travel direction of the vehicle, when the control device determines that the vehicle has stopped at the switching position, the control device cancels the decelerated state.

When the vehicle reaches the switching position, the traveling direction of the vehicle is switched from the forward direction to the backward direction or from the backward direction to the forward direction (namely, the traveling direction of the vehicle is reversed). Thus, the obstacle present in the traveling direction before the vehicle reaches the switching position no longer prevents the reversed movement of the vehicle after the vehicle reaches the switching position. In light of such a situation, the decelerated state is canceled when the vehicle reaches the switching position, so that it is possible to suppress an increase in the time required to move the vehicle to the target position.

Preferably, the second area is set only when the vehicle is moving forward, and a movement speed of the vehicle when the vehicle is moving backward during the control of the vehicle to the target position is set at the prescribed speed.

According to this arrangement, when the vehicle moves backward, the vehicle moves at the prescribed speed at which the vehicle moves forward in the decelerated state. Thus, it is possible to ensure the safety around the vehicle without setting the second area when the vehicle moves backward.

Preferably, after the control device recognizes the obstacle in the first area and then stops the vehicle, in a case where the external environment sensor, which has detected the obstacle in a side area of the vehicle in the first area, no longer detects the obstacle in the first area, the control device does not allow resumption of a movement of the vehicle to the target position, and in a case where the external environment sensor, which has detected the obstacle in an area other than the side area of the vehicle in the first area, no longer detects the obstacle in the first area, the control device allows the resumption of the movement of the vehicle to the target position.

The external environment sensor may have a blind spot in the side area of the vehicle. If the obstacle moves to the blind spot thereof, the external environment sensor may not detect the obstacle even though the obstacle is present in the first area. According to the above arrangement, the safety around the vehicle is ensured even in such a case since the automatic parking process is not resumed. Also, the external environment sensor may not have any blind spot in the area other than the side area of the vehicle. In light of such a situation, in a case where the external environment sensor, which has detected the obstacle in the area other than the side area of the vehicle in the first area, no longer detects the obstacle in the first area, the control device allows the resumption of the movement of the vehicle to the target position (namely, the control device allows the resumption of the automatic parking process), so that the convenience of the driver can be enhanced.

Thus, according to one embodiment of the present invention, it is possible to provide a parking assist system that can improve both the convenience of the driver and the safety around the vehicle without increasing the time required for the automatic parking process.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
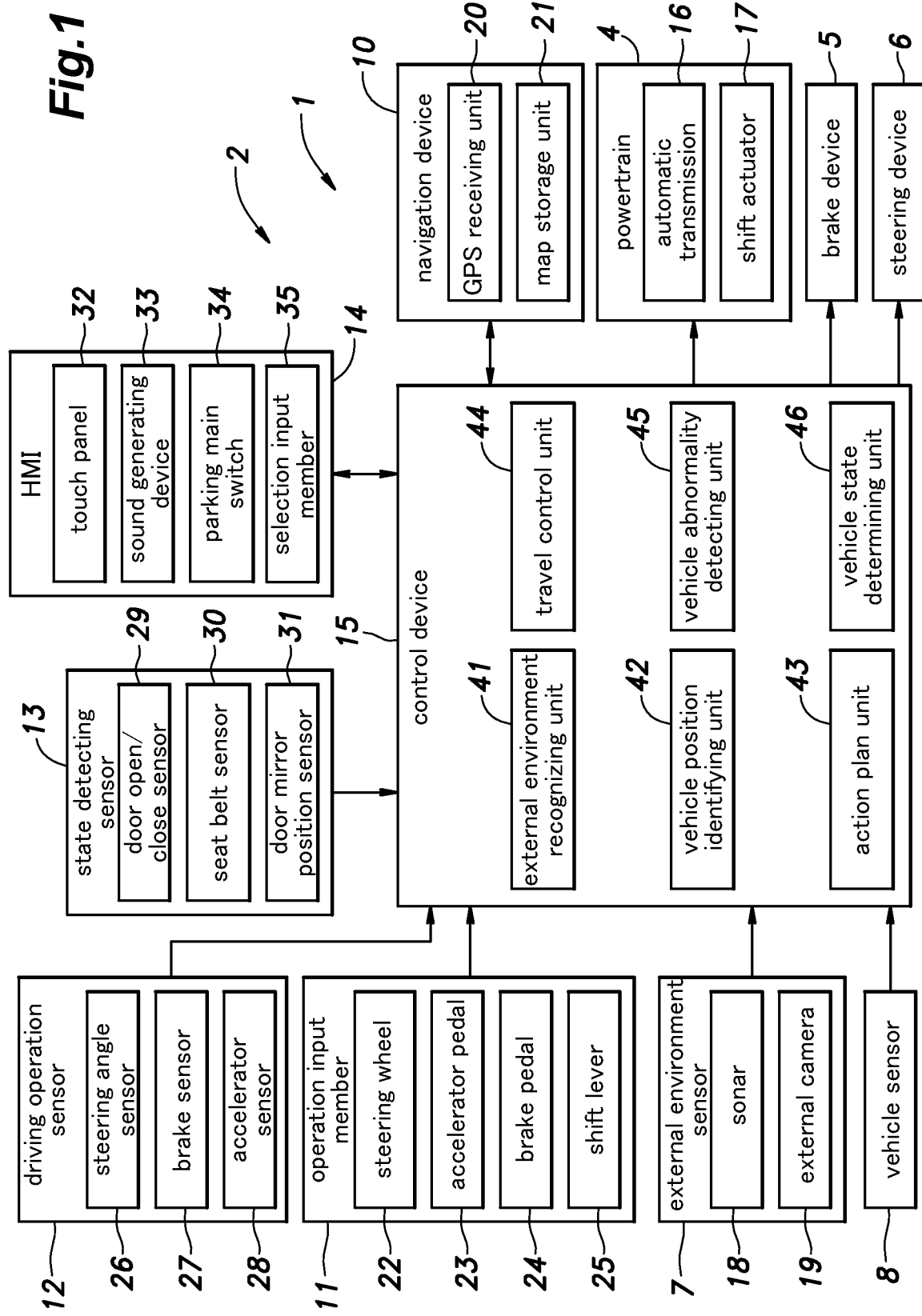
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the control device 15, the brake pedal 24 as a brake input member, the driving operation sensor 12, and the state detecting sensor 13.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

In the present embodiment, the vehicle abnormality detecting unit 45 can detect an abnormality in the screen display of the touch panel 32 based on at least a signal from the touch panel 32.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

Also, when it is determined, based on the detection result of the state detecting sensor 13, that the door is opened and the seat belt is released, the vehicle state determining unit 46 determines that the alighting intention of the occupant is certain and that the vehicle is in a cancellation state in which the autonomous movement (namely, the autonomous parking operation or the autonomous unparking operation) of the vehicle should be canceled. In addition, the vehicle state determining unit 46 may determine that the vehicle is in the cancellation state when there is an input to a cancellation button displayed on the touch panel 32 while the vehicle is moving autonomously.

In the present embodiment, each vehicle seat provided in the vehicle cabin is provided with a seating sensor configured to detect seating of the occupant. The vehicle state determining unit 46 determines a seating position of the occupant (namely, the vehicle state determining unit 46 identifies the vehicle seat on which the occupant is seated) based on a signal from the seating sensor, and determines that the vehicle is in the cancellation state when the seat belt at the seating position is released and the door near the seating position is opened.

As described above, the driving operation sensor 12 and the state detecting sensor 13 each correspond to the vehicle state detecting device configured to detect the state of the vehicle (for example, the prohibition state in which the autonomous parking operation or the autonomous unparking operation of the vehicle should be prohibited). The vehicle state determining unit 46 determines the state of the vehicle based on the detection results of the driving operation sensor 12 and the state detecting sensor 13. By using the driving operation sensor 12, it is possible to easily detect the override operation of the occupant. By using the state detecting sensor 13, it is possible to easily detect an alighting operation of the user and a change in the state of the vehicle according to an extending/retracting operation of the door mirror.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Figure 3A:
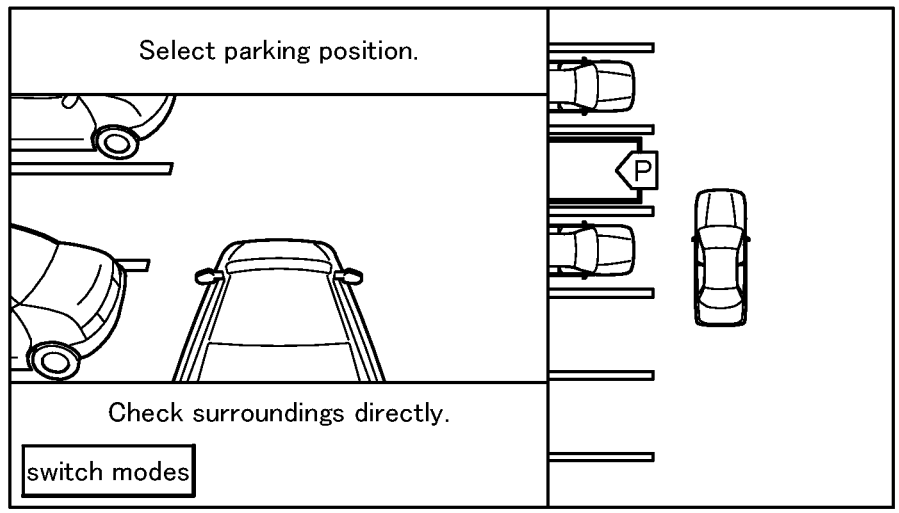
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
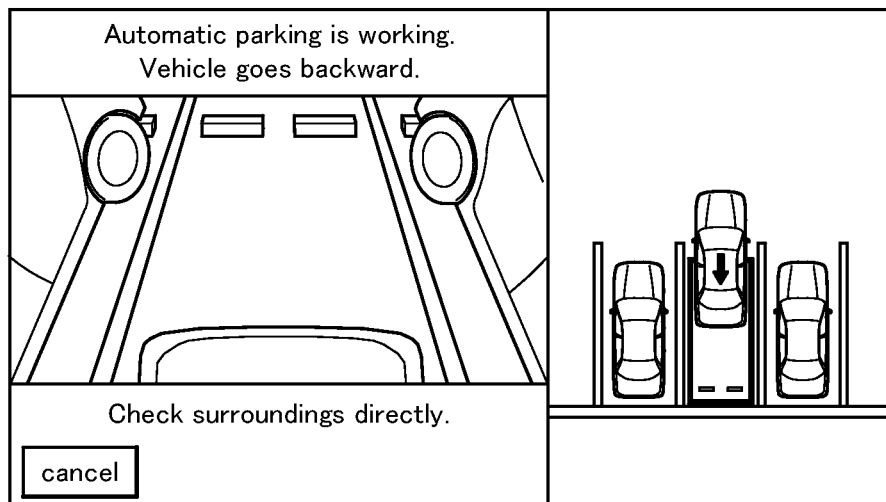
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
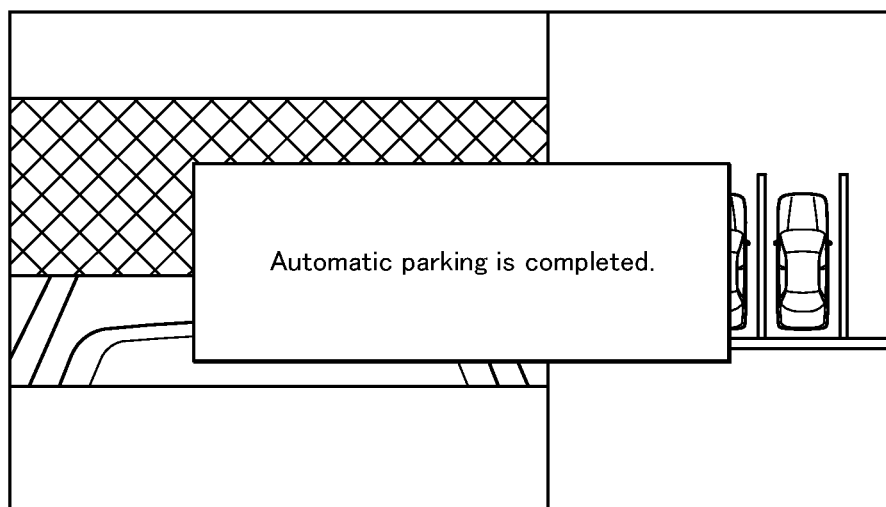
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Figure 4:
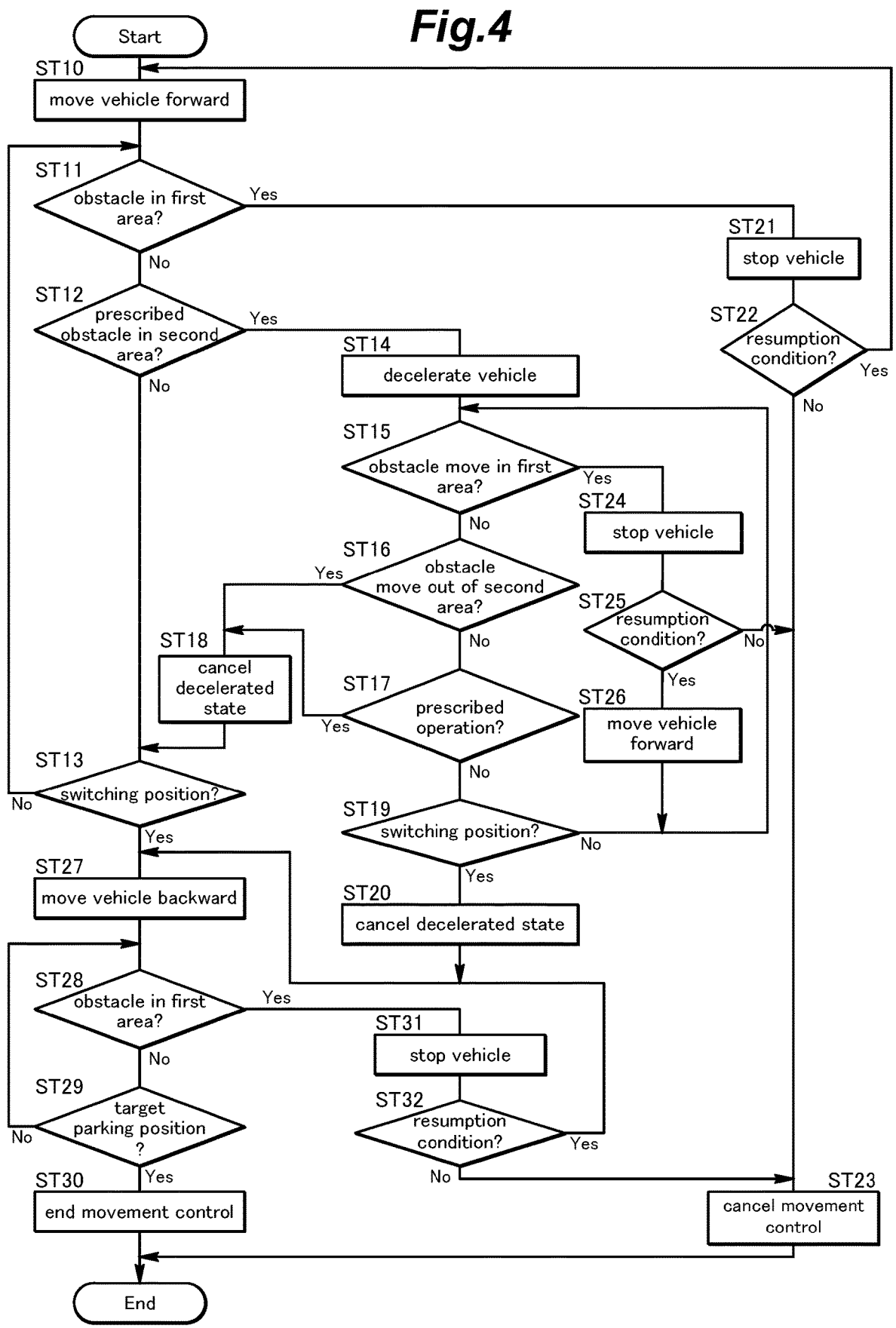
FIG. 4 is a flow chart showing details of a driving process and a parking process in the parking assist system according to the embodiment.
Figure 5:
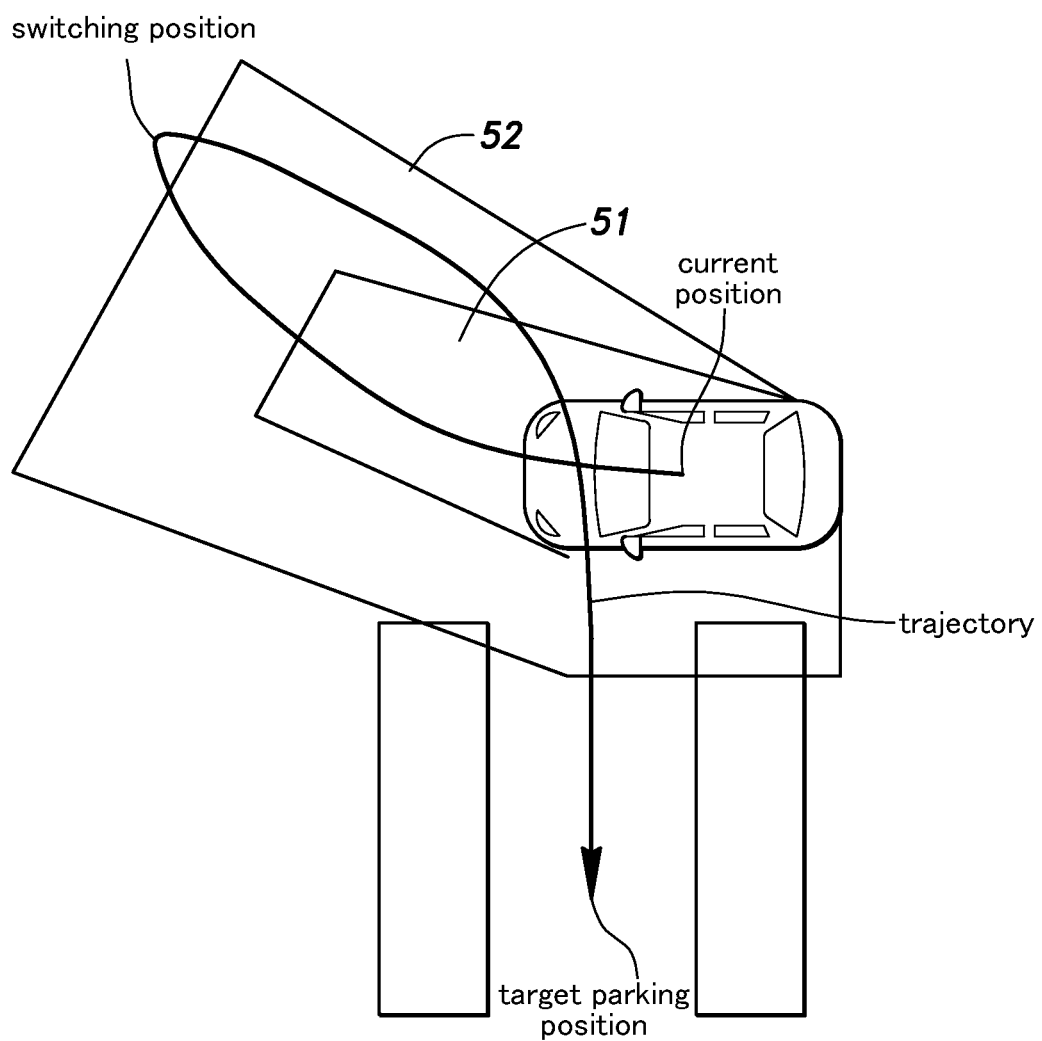
FIG. 5 is a plan view showing areas where a control device recognizes an obstacle in the parking assist system according to the embodiment.

Next, with reference to FIGS. 1, 4 and 5, the details of the automatic parking process (more specifically, the details of the driving process (step ST4) and the parking process (step ST5) of FIG. 2) will be described with regard to a case where the external environment sensor 7 detects the obstacle during the automatic parking process. In the following, the automatic parking process to move the vehicle from the current position to the target parking position will be described as an example. However, the present invention can be applied to the automatic unparking process to move the vehicle from the current position to the target unparking position in the vicinity thereof.

Figure 2:
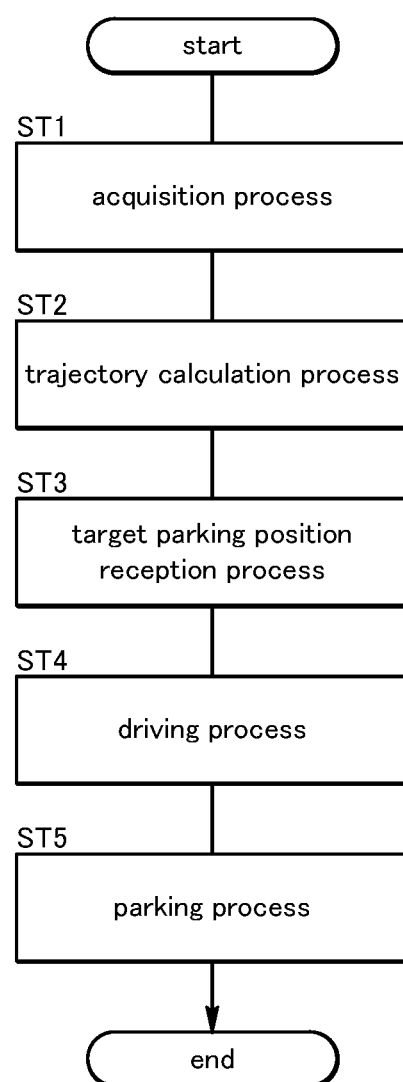
FIG. 2 is a flow chart of an automatic parking process in the parking assist system according to the embodiment.

In the present embodiment, the action plan unit 43 of the control device 15 calculates the trajectory (movement route) of the vehicle such that the vehicle moves forward from the current position to a switching position, then stops at the switching position, then moves backward from the switching position to the target parking position, and then stops at the target parking position (see step ST2 in FIG. 2). First, the control device 15 starts control of the vehicle to the target parking position (hereinafter referred to as "movement control") and thereby the travel control unit 44 of the control device 15 moves the vehicle forward at a normal movement speed along the trajectory (step ST10). The normal movement speed, which is a forward movement speed of the vehicle in a case where the external environment sensor 7 does not detect the obstacle, is about 4 km/h, for example.

Next, the external environment recognizing unit 41 of the control device 15 determines whether the obstacle is present in a first area 51, which is an area where a collision between the vehicle and the obstacle is possible, based on the information from the external environment sensor 7 (step ST11). In a case where the external environment recognizing unit 41 determines that the obstacle is not present in the first area 51 (No in step ST11), the external environment recognizing unit 41 determines whether a prescribed obstacle is present in a second area 52 provided in a prescribed area outside the first area 51 (step ST12). In a case where the external environment recognizing unit 41 determines that the prescribed obstacle is not present in the second area 52 (No in step ST12), the action plan unit 43 determines whether the vehicle has reached the switching position (step ST13). In a case where the action plan unit 43 determines that the vehicle has not reached the switching position (No in step ST13), the external environment recognizing unit 41 executes the determination in step ST11 again. In this way, the control device 15 repeats the determinations of step ST11 and step ST12 until the vehicle reaches the switching position. When the vehicle reaches the switching position, the control device 15 stops the vehicle.

The first area 51 during a forward movement of the vehicle includes a prescribed area provided in front of the vehicle and extending along the trajectory of the vehicle. The first area 51 during the forward movement of the vehicle may include a side area of the vehicle, and more specifically, a side area in the turning direction of the vehicle (namely, a right side area of the vehicle when the vehicle turns right, and a left side area of the vehicle when the vehicle turns left). The length of the first area 51 in front of the vehicle is set to the shorter of a prescribed distance from the front end of the vehicle at the present time or a distance from the front end of the vehicle at the present time to the front end of the vehicle at the switching position. Preferably, the width of the first area 51 in front of the vehicle is wider than the width of the vehicle, and widens as the distance from the vehicle increases. The second area 52 is an area for detecting the obstacle that may enter the first area 51, and is provided so as to be adjacent to at least one of left and right edges (namely, at least one lateral edge) of the first area 51 and/or a front edge (namely, an edge at a side remote from the vehicle) of the first area 51. In the present embodiment, the second area 52 is provided so as to be adjacent to the left and right edges and the front edge of the first area 51. In a case where the first area 51 is not provided so as to be adjacent to at least one lateral face of the vehicle, the second area 52 may be provided so as to be adjacent to the at least one lateral face of the vehicle. The "prescribed obstacle" in the second area 52 (see step ST12) is a moving object and a moving creature. The external environment recognizing unit 41 obtains the difference between the image captured by the external cameras 19 at the present time and the image captured by the external cameras 19 immediately before the present time, and thereby determines whether the obstacle captured by the external cameras 19 is a moving object. Further, the external environment recognizing unit 41 compares the obstacle captured by the external cameras 19 at the present time with a preset pattern of a creature such as a person, a dog, or a cat, and thereby determines whether the obstacle captured by the external cameras 19 is a moving creature.

When the external environment recognizing unit 41 determines that the obstacle is present in the first area 51 (Yes in step ST11), the control device 15 stops the vehicle (step ST21). When stopping the vehicle, the control device 15 may make the touch panel 32 display a message indicating that the vehicle is stopped because the obstacle is present. Additionally or alternatively, the control device 15 may make the sound generating device 33 generate a warning sound and/or a voice indicating that the vehicle is stopped because the obstacle is present. Next, the control device 15 determines whether a resumption condition for resuming the movement of the vehicle in the movement control (automatic parking process) is satisfied (step ST22). When the control device 15 determines that the resumption condition is satisfied (Yes in step ST22), the control device 15 returns to step ST10. Otherwise (No in step ST22), the control device 15 cancels the movement control (automatic parking process) (step ST23). After the movement control (automatic parking process) is canceled, the driver may perform a manual parking process according to his/her own driving operation or make the control device 15 execute the automatic parking process again from the acquisition process (step ST1 in FIG. 2).

In a case where the external environment recognizing unit 41 determines that the obstacle is not present in the first area 51 (No in step ST11) and that the prescribed obstacle (namely, the moving object and/or the moving creature) is present in the second area 52 (Yes in step ST12), the control device 15 decelerates the vehicle so that the vehicle moves in a decelerated state in which the vehicle is decelerated to a prescribed speed, which is 2 km/h, for example (step ST14).

While the vehicle is moving in the decelerated state, the external environment recognizing unit 41 determines whether the obstacle, which has been present in the second area 52, has moved in the first area 51 (step ST15). In a case where the external environment recognizing unit 41 determines that the obstacle has moved in the first area 51 (for example, in a case where the obstacle comes to be located in the first area 51 according to the displacement of the first area 51 due to the movement of the vehicle; Yes in step ST15), the control device 15 stops the vehicle (step ST24). Since the vehicle is moving in the decelerated state, the vehicle can be stopped in a short time and with a short distance after the obstacle moves in the first area 51, and thereby the safety around the vehicle can be enhanced. When stopping the vehicle, the control device 15 may make the touch panel 32 display a message indicating that the vehicle is stopped because the obstacle is present. Additionally or alternatively, the control device 15 may make the sound generating device 33 generate a warning sound and/or a voice indicating that the vehicle is stopped because the obstacle is present. After stopping the vehicle in step ST24, the control device 15 determines whether the resumption condition is satisfied (step ST25). When the control device 15 determines that the resumption condition is satisfied (Yes in step ST25), the control device 15 moves the vehicle forward at the prescribed speed in the decelerated state (step ST26) and returns to step ST15. Otherwise (No in step ST25), the control device 15 cancels the movement control (automatic parking process) (step ST23).

In addition, in a case where the external environment recognizing unit 41 determines that the obstacle has not moved in the first area 51 (No in step ST15), the external environment recognizing unit 41 determines whether the obstacle has moved out of the second area 52 (step ST16). In a case where the external environment recognizing unit 41 determines that the obstacle has not moved out of the second area 52 (No in step ST16), the control device 15 determines whether the driver has performed a prescribed operation (step ST17). In a case where the external environment recognizing unit 41 determines that the obstacle has moved out of the second area 52 (for example, in a case where the obstacle comes to be located out of the second area 52 according to the displacement of the second area 52 due to the movement of the vehicle; Yes in step ST16) or in a case where the control device 15 determines that the driver has performed the prescribed operation (namely, in a case where it can be estimated that the driver judges that the risk caused by the obstacle is not present or avoided; Yes in step ST17), the control device 15 cancels the decelerated state of the vehicle and returns the movement speed of the vehicle to the normal movement speed (step ST18). By returning the movement speed of the vehicle in these cases on condition that the risk caused by the obstacle is not present or avoided, it is possible to shorten the time required for completing the movement control (automatic parking process).

The control device 15 sets the following first to the third operations as the prescribed operation performed by the driver (see step ST17). The first operation is an operation by the driver to press the brake pedal 24 and then release the brake pedal 24 (return the brake pedal 24 to its original position). The control device 15 determines whether the first operation is performed by the driver based on information from the brake sensor 27. In a case where the first operation is performed by the driver, it can be estimated that the driver, who has recognized the obstacle and thereby has pressed the brake pedal 24, judges that the danger caused by the obstacle is not present or avoided and thereby releases the brake pedal 24. For example, the driver may perform the first operation in a case where a person approaches the vehicle and then sends a signal to the driver to continue the movement control (automatic parking process). The second operation is an operation by the driver to press the accelerator pedal 23. In a case where the second operation is performed, it can be estimated that the driver judges that the danger caused by the obstacle is not present and thereby presses the accelerator pedal 23 after the vehicle is decelerated. The third operation is an operation by the driver to press a button for canceling the decelerated state. The control device 15 may make the touch panel 32 display a pop-up window including the button for canceling the decelerated state. In a case where the third operation is performed, it can be estimated that the driver judges that it is not dangerous to return the movement speed of the vehicle to the normal movement speed. The control device 15 may set a threshold for the pressing amount of the brake pedal 24 and/or the accelerator pedal 23, and determine that the first operation and/or the second operation is performed in a case where the pressing amount of the brake pedal 24 and/or the accelerator pedal 23 becomes equal to or more than the threshold.

After canceling the decelerated state of the vehicle (step ST18), the control device 15 repeats steps ST11 to ST13. In such a case, the obstacle whose danger is judged to be not present or avoided in step ST17 is not regarded as an obstacle in step ST12. Even so, the control device 15 stops the vehicle (step ST21) if the above obstacle moves in the first area 51 (Yes in step ST11), so that the safety around the vehicle is ensured. In a case where the control device 15 determines that the driver has not performed the prescribed operation (No in step ST17), the control device 15 determines whether the vehicle has reached the switching position (step ST19). In a case where the control device 15 determines that the vehicle has not reached the switching position (No in step ST19), the control device 15 executes step ST15 again. In this way, the control device 15 repeats steps ST15 to ST17 until the vehicle reaches the switching position. When the vehicle reaches the switching position (Yes in step ST19), the control device 15 stops the vehicle and cancels the decelerated state of the vehicle (step ST20).

When the vehicle reaches the switching position and then is stopped (steps ST13 and ST19), the control device 15 moves the vehicle backward along the trajectory (step ST27). While the vehicle is moving backward, the external environment recognizing unit 41 determines whether the obstacle is present in the first area 51 (step ST28). In a case where the external environment recognizing unit 41 determines that the obstacle is present in the first area 51 (Yes in step ST28), the control device 15 stops the vehicle (step ST31) and determines whether the resumption condition is satisfied (step ST32). When the control device 15 determines that the resumption condition is satisfied (Yes in step ST32), the control device 15 returns to step ST27. Otherwise (No in step ST32), the control device 15 cancels the movement control (automatic parking process) (step ST23).

The first area 51 during a backward movement of the vehicle includes a prescribed area provided behind the vehicle and extending along the trajectory of the vehicle. The first area 51 during the backward movement of the vehicle may include a side area of the vehicle, and more specifically, a side area in the turning direction of the vehicle (namely, a right side area of the vehicle when the vehicle turns right, and a left side area of the vehicle when the vehicle turns left). The length of the first area 51 behind the vehicle is set to the shorter of a prescribed distance from the rear end of the vehicle at the present time or a distance from the rear end of the vehicle at the present time to the rear end of the vehicle at the target parking position. Preferably, the width of the first area 51 behind the vehicle is slightly wider than the width of the vehicle, and widens as the distance from the vehicle increases.

In the present embodiment, the parking assist system 1 requires the driver to check the surroundings of the vehicle. Generally speaking, it is more difficult for the driver to check the surroundings of the vehicle moving backward than to check the surroundings of the vehicle moving forward. In light of such a situation, the backward movement speed of the vehicle is set to about 2 km/h, which is approximately equal to the prescribed speed at which the vehicle moves forward in the decelerated state. In a case where the control device 15 determines that the obstacle is present in the first area 51 when the vehicle is moving backward (Yes in step ST28), the control device 15 stops the vehicle (step ST31), like a case where the control device 15 determines that the obstacle is present in the first area 51 when the vehicle is moving forward (step ST21). Since the control device 15 moves the vehicle backward at a sufficiently low speed, the vehicle is not decelerated even if the prescribed obstacle (namely, the moving object and/or the moving creature) is present outside the first area 51. In this way, the safety around the vehicle can be ensured when the vehicle moves backward by moving the vehicle at a low speed from the beginning. Further, since the vehicle is not further decelerated when the vehicle moves backward, it is possible to suppress an increase in the time required for the movement control (automatic parking process) and thereby to prevent the convenience of the occupant and the person around the vehicle from being deteriorated. The width and maximum length of the first area 51 during the backward movement of the vehicle may be the same as or different from those of the first area 51 during the forward movement of the vehicle.

In other embodiments, the parking assist system 1 may not require the driver to check the surroundings of the vehicle. In such a case, the control device 15 may set the second area 52 even when the vehicle is moving backward, and execute the process for decelerating the vehicle and the process for canceling the decelerated state of the vehicle during the backward movement of the vehicle, as the control device 15 does during the forward movement of the vehicle. The above second area 52 during the backward movement of the vehicle may be provided so as to be adjacent to the left and right edges and the rear edge of the first area 51 during the backward movement of the vehicle. In a case where the first area 51 during the backward movement of the vehicle is not provided so as to be adjacent to at least one lateral face of the vehicle, the second area 52 during the backward movement of the vehicle may be provided so as to be adjacent to the at least one lateral face of the vehicle. The width and maximum length of the second area 52 during the backward movement of the vehicle may be the same as or different from those of the second area 52 during the forward movement of the vehicle.

In a case where the external environment recognizing unit 41 determines that the obstacle is not present in the first area 51 (No in step ST28), the control device 15 determines whether the vehicle has reached the target parking position (step ST29). In a case where the control device 15 determines that the vehicle has not reached the target parking position (No in step ST29), the control device 15 executes the determination of step ST28 again. In a case where the control device 15 determines that the vehicle has reached the target parking position (Yes in step ST29), the control device 15 stops the vehicle, executes the parking process (step ST5 in FIG. 2), and ends the movement control (automatic parking process) (step ST30).

Next, with reference to FIGS. 1 and 5 to 8, the resumption condition for resuming the movement of the vehicle in the movement control (automatic parking process) after the control device 15 stops the vehicle (the control device 15 suspends the movement of the vehicle) due to the detection of the obstacle will be described.

Figure 6A:
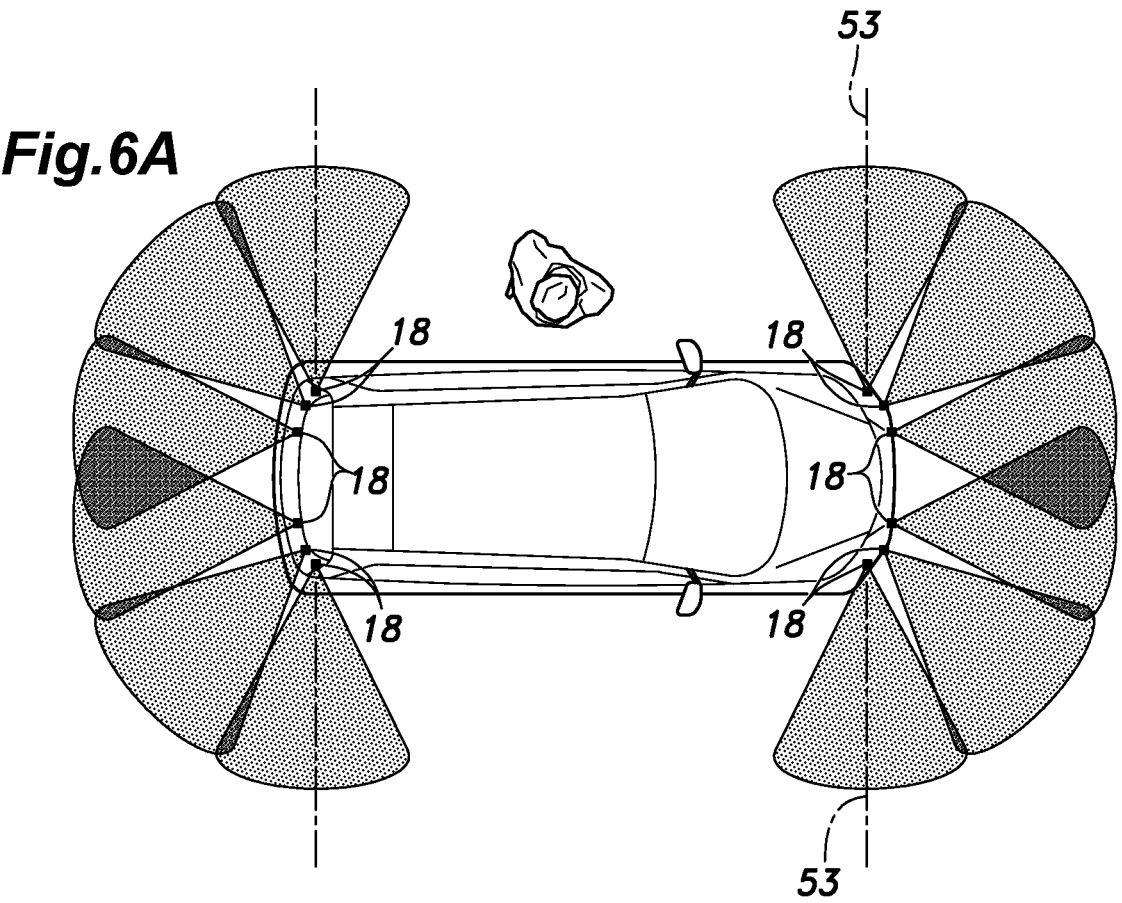
FIG. 6A is a schematic plan view showing sonars provided in the vehicle and the detection areas thereof in the parking assist system according to the embodiment.
Figure 6B:
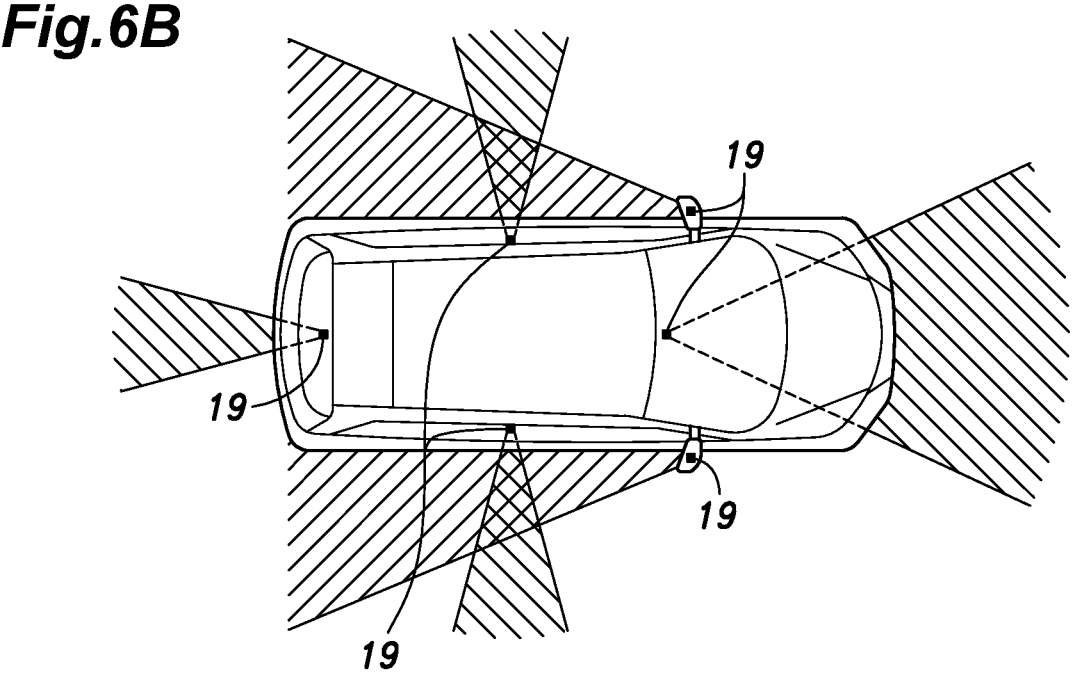
FIG. 6B is a schematic plan view showing external cameras provided in the vehicle and the image capturing areas thereof in the parking assist system according to the embodiment.

As shown in FIG. 6A, two pairs of sonars 18 are provided on left and right sides of a rear bumper, two pairs of sonars 18 are provided on left and right sides of a front bumper, and one pair of sonars 17 are provided at front and rear ends of the left and right faces of the vehicle. As shown in FIG. 6B, the external cameras 19 include a front camera provided inside a windshield, a rear camera provided inside back glass, a pair of left and right door mirror cameras installed on the door mirrors so as to capture images of the rear of the left and right sides of the vehicle, a pair of left and right pillar cameras provided on center pillars (B pillars) so as to capture images of the left and right sides of the vehicle. The detection areas of the sonars 18 are colored in FIG. 6A and the image capturing areas of the external cameras 19 are hatched in FIG. 6B. Two side areas 53 of the vehicle each include a blind spot that is not detected by either the sonars 18 or the external cameras 19. In the present embodiment, the side areas 53 are set to lateral areas of the vehicle between the sonars 18 provided at the front and rear ends of the left and right faces of the vehicle. In other embodiments, the side areas 53 may be set to lateral areas of the vehicle between the front and rear ends of the vehicle. Alternatively, the side areas 53 may be set to lateral areas of the vehicle between a first line extending obliquely outward and forward from the left and right corners at a front end side of the vehicle and a second line extending obliquely outward and backward from the left and right corners at the rear end side of the vehicle. The angle between the first and second lines and the lateral direction of the vehicle may be greater than 0° and equal to or less than 45°. In a case where the obstacle moves from the detection areas of the sonars 18 and/or the image capturing areas of the external cameras 19 to the blind spot in the first area 51, the external environment sensor 7 such as the sonars 18 and the external cameras 19 may fail to detect the obstacle present in the first area 51. In such a case, the control device 15 controls the vehicle so as not to resume the movement of the vehicle in the movement control (automatic parking process).

Figure 7:
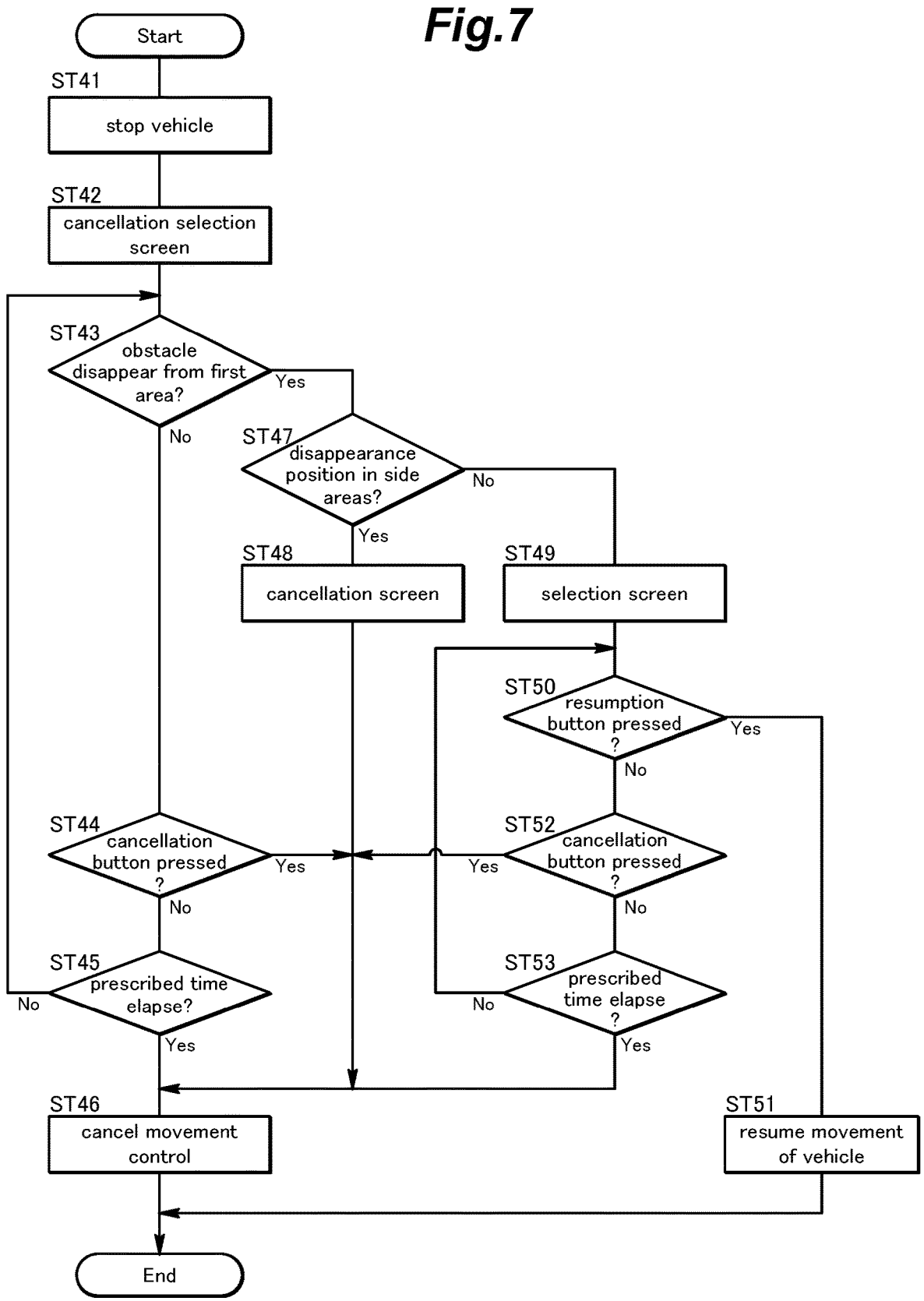
FIG. 7 is a flow chart showing a movement control (specifically, cancellation and resumption of the movement control) of the vehicle in the parking assist system according to the embodiment.

As shown in FIG. 7, when the external environment sensor 7 detects the obstacle in the first area 51, the travel control unit 44 of the control device 15 stops the vehicle (step ST41). This step ST41 corresponds to any of step ST21, step ST24 and step ST31 of FIG. 4. Subsequently, the control device 15 makes the touch panel 32 display a cancellation selection screen as a pop-up window (step ST42, FIG. 8A). The cancellation selection screen includes a message indicating that the vehicle has been stopped due to the detection of the obstacle and a cancellation button for canceling the movement control (automatic parking process). Next, the control device 15 determines whether the obstacle has disappeared from the first area 51 based on the information from the external environment sensor 7 (step ST43). In a case where the control device 15 determines that the obstacle has not disappeared from the first area 51 (No in step ST43), the control device 15 determines whether the cancellation button has been pressed (step ST44). In a case where the control device 15 determines that the cancellation button has been pressed (Yes in step ST44), the control device 15 cancels the movement control (automatic parking process) (step ST46). This step ST46 corresponds to step ST23 in FIG. 4. In a case where the control device 15 determines that the cancellation button has not been pressed (No in step ST44), the control device 15 determines whether the prescribed time has elapsed (step ST45). In a case where the control device 15 determines that the prescribed time has not elapsed (No in step ST45), the control device 15 returns to step ST43. In a case where the control device 15 determines that the prescribed time has elapsed (Yes in step ST45), the control device 15 cancels the movement control (automatic parking process) (step ST46). In this way, when the driver presses the cancellation button (Yes in step ST44) or the prescribed time elapses (Yes in step ST45) before the obstacle disappears from the detectable area of the external environment sensor 7 in the first area 51, the control device 15 cancels the movement control (automatic parking process).

In a case where the control device 15 determines that the obstacle has disappeared from the first area 51 (Yes in step ST43), the control device 15 determines whether a disappearance position where the obstacle has disappeared from the first area 51 is in the side areas 53 (step ST47). In this way, in a case where the obstacle disappears from the detectable area of the external environment sensor 7 in the first area 51 (Yes in step ST43) before the driver presses the cancellation button (No in step ST44) and the prescribed time elapses (No in step ST45), the process thereafter is changed as to whether the disappearance position is in the side areas 53 (step ST47). In a case where the control device 15 determines that the disappearance position is in the side areas 53 (Yes in step ST47), the action plan unit 43 of the control device 15 makes the touch panel 32 display a cancellation screen (see FIG. 8C) as a pop-up window (step ST48). The cancellation screen includes the cancellation button for canceling the movement control (automatic parking process) and a message to urge the driver to press the cancellation button. In a case where the control device 15 determines that the disappearance position is not in the side areas 53 (No in step ST47), the action plan unit 43 makes the touch panel 32 display a selection screen (see FIG. 8B) as a pop-up window (step ST49). The selection screen includes the cancellation button for canceling the movement control (automatic parking process), a resumption button for resuming the movement of the vehicle in the movement control (automatic parking process), a message indicating that the obstacle has moved, and a message to urge the driver to press the cancellation button or the resumption button.

Figure 8A:
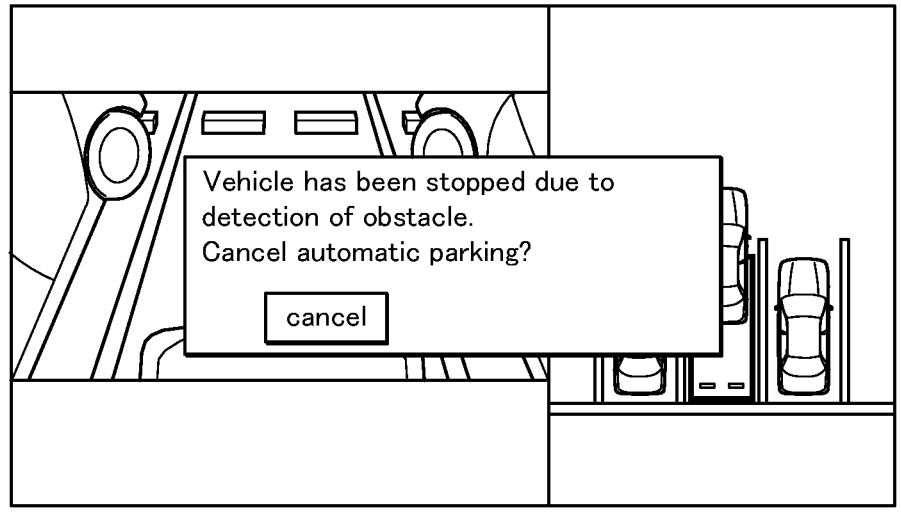
FIG. 8A is a diagram showing the screen display of the touch panel immediately after the vehicle is stopped due to detection of the obstacle.
Figure 8B:
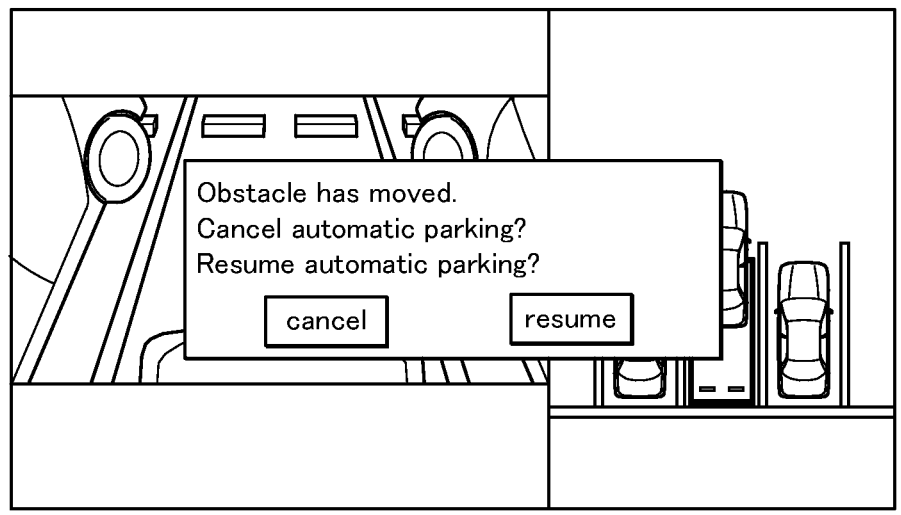
FIG. 8B is a diagram showing the screen display of the touch panel when the obstacle surely moves out of a first area.
Figure 8C:
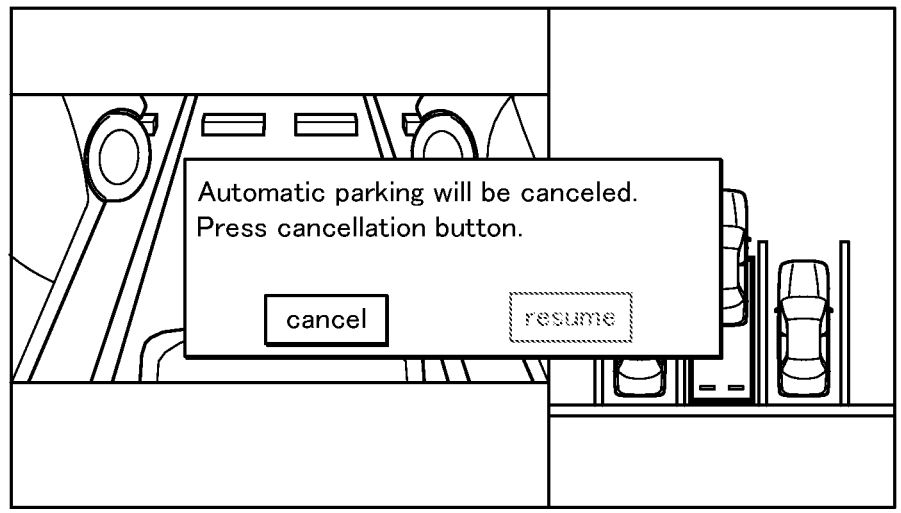
FIG. 8C is a diagram showing the screen display of the touch panel when the obstacle is no longer detected in the side area of the vehicle in the first area.

The action plan unit 43 may make the touch panel 32 display the resumption button in a non-selectable state (FIG. 8C). For example, the resumption button in the non-selectable state may be displayed in a lighter color than the resumption button in a selectable state in the selection screen (FIG. 8B) or may be displayed with a mesh pattern. Instead of or in addition to displaying the resumption button in the non-selectable state, the action plan unit 43 may make the touch panel 32 display a message that the automatic parking process cannot be resumed or may make the sound generating device 33 generate such a message.

After the cancellation screen is displayed (step ST48), when the driver presses the cancellation button or the prescribed time has elapsed, the control device 15 cancels the movement control (the automatic parking process) (step ST46). This step ST46 corresponds to step ST23 in FIG. 4. Further, after the selection screen is displayed (step ST49), the control device 15 determines whether the resumption button has been pressed (step ST50). In a case where the control device 15 determines that the resumption button has been pressed (Yes in step ST50), the travel control unit 44 resumes the movement of the vehicle in the movement control (the automatic parking process) (step ST51). This step ST51 corresponds to "Yes" in step ST22, "Yes" in step ST25, and "Yes" in step ST32 in FIG. 4. In a case where the control device 15 determines that the resumption button has not been pressed (No in step ST50), the control device 15 determines whether the cancellation button has been pressed (step ST52). In a case where the control device 15 determines that the cancellation button has been pressed (Yes in step ST52), the control device 15 cancels the movement control (automatic parking process) (step ST46). This step ST46 corresponds to step ST23 of FIG. 4. In a case where the control device 15 determines that the cancellation button has not been pressed (No in step ST52), the control device 15 determines whether the prescribed time has elapsed (step ST53). In a case where the control device 15 determines that the prescribed time has not elapsed (No in step ST53), the control device 15 returns to step ST50. In a case where the control device 15 determines that the prescribed time has elapsed (Yes in step ST53), the control device 15 cancels the movement control (automatic parking process) (step ST46). In this way, after the selection screen is displayed, when the driver presses the resumption button (Yes in step ST50) within the prescribed time (No in step ST53), the travel control unit 44 resumes the movement of the vehicle in the movement control (the automatic parking process) (step ST51). The action plan unit 43 may require the driver to press the brake pedal 24 before resuming the movement of the vehicle, and the travel control unit 44 may resume the movement of the vehicle after the brake pedal 24 is pressed and then released or loosened. As described above, after the selection screen is displayed, when the driver presses the cancellation button (Yes in step ST52) or the prescribed time elapses (Yes in step ST53), the control device 15 cancels the movement control (automatic parking process) (step ST46).

In a case where the external environment sensor 7, which has detected the obstacle in the side areas 53 of the vehicle in the first area 51, no longer detects the obstacle in the first area 51, the obstacle may be present in the blind spot of the external environment sensor 7 in the first area 51. In such a case, the travel control unit 44 does not allow resumption of the movement of the vehicle to the target position in the automatic parking process, so that the safety around the vehicle can be ensured. In addition, since the movement of the vehicle to the target position in the automatic parking process is not resumed, it is possible to make the driver recognize that the automatic parking process cannot be resumed and thereby to urge the driver to check the safety around the vehicle. Thus, it is possible to enhance the safety around the vehicle in a case where the driver performs a manual parking operation after the automatic parking process is canceled. On the other hand, in a case where the external environment sensor 7, which has detected the obstacle in an area other than the side areas 53 of the vehicle in the first area 51, no longer detects the obstacle in the first area 51, the control device 15 allows the resumption of the movement of the vehicle to the target position in the automatic parking process, so that it is possible to improve the convenience of the driver.

Concrete embodiments of the present invention have been described in the foregoing, but the present invention should not be limited by the foregoing embodiments and various modifications and alterations are possible within the scope of the present invention. In other embodiments, the action plan unit 43 of the control device 15 may calculate the trajectory of the vehicle so as to switch the travel direction of the vehicle plural times (namely, so as to include plural switching positions). In such a case, when the vehicle moves backward before the travel direction of the vehicle is finally switched, "the target parking position" of the automatic parking process in the above embodiment may be replaced with "the switching position" and the control device 15 may return to step ST10 after the vehicle reaches the switching position (step ST13), so that the present invention can be applied to such a case. Also, in other embodiments, the vehicle may move forward immediately before the vehicle reaches the target parking position. In such a case, when the vehicle moves forward after the travel direction of the vehicle is finally switched, "the switching position" of the automatic parking process in the above embodiment may be replaced with "the target parking position" and the control device 15 may execute the parking process to end the movement control of the vehicle after the vehicle reaches the switching position (step ST13) or the decelerated state is canceled (step ST20), so that the present invention can be applied to such a case.

The invention claimed is:

1. A parking assist system, comprising:
    a control device configured to control a vehicle including a powertrain, a brake device, and a steering device so as to move the vehicle autonomously from a current position to a target position along a trajectory, and to calculate the trajectory; and
    an external environment sensor configured to detect an obstacle present in a traveling direction of the vehicle,
    wherein during control of the vehicle to the target position,
    the control device is configured to recognize the obstacle present in a first area and a second area based on information from the external environment sensor, the first area being provided in a prescribed area from the vehicle, the second area being provided in a prescribed area outside the first area so as to be adjacent to at least one lateral edge of the first area or an edge of the first area at a side remote from the vehicle,
    in a case where the control device does not recognize the obstacle in the first area nor the second area, the control device moves the vehicle with a normal speed which is set for a movement toward the traveling direction,
    in a case where the control device recognizes the obstacle in the first area, the control device stops the vehicle, and
    in a case where the control device recognizes the obstacle in the second area and the obstacle in the second area is a moving object or a moving creature, the control device moves the vehicle in a decelerated state in which the vehicle is decelerated to a prescribed speed which is slower than the normal speed,
    wherein the second area is set only when the vehicle is moving forward, and
    a movement speed of the vehicle when the vehicle is moving backward during the control of the vehicle to the target position is set at the prescribed speed.

2. The parking assist system according to claim 1, further comprising a brake sensor configured to detect a brake operation for driving the brake device by a driver,
    wherein in the decelerated state, when the control device determines that the brake operation by the driver is performed and then stopped based on information from the brake sensor, the control device cancels the decelerated state to move the vehicle with the normal speed.

3. The parking assist system according to claim 1, further comprising an accelerator sensor configured to detect an acceleration operation for driving the powertrain by a driver,
    wherein in the decelerated state, when the control device determines that the acceleration operation by the driver is performed based on information from the accelerator sensor, the control device cancels the decelerated state to move the vehicle with the normal speed.

4. The parking assist system according to claim 1, further comprising an input device configured to receive an instruction from a driver,
    wherein in the decelerated state, when the input device receives the instruction from the driver to cancel the decelerated state, the control device cancels the decelerated state to move the vehicle with the normal speed.

5. The parking assist system according to claim 1, wherein in the decelerated state in a case where the trajectory includes a switching position for switching the travel direction of the vehicle, when the control device determines that the vehicle has stopped at the switching position, the control device cancels the decelerated state to move the vehicle toward an opposite direction of the traveling direction with an opposite-direction normal speed which is set for a movement toward the opposite direction.

6. A parking assist system, comprising:
a control device configured to control a vehicle including a powertrain, a brake device, and a steering device so as to move the vehicle autonomously from a current position to a target position along a trajectory, and to calculate the trajectory; and
an external environment sensor configured to detect an obstacle present in a traveling direction of the vehicle,
wherein during control of the vehicle to the target position,
the control device is configured to recognize the obstacle present in a first area and a second area based on information from the external environment sensor, the first area being provided in a prescribed area from the vehicle, the second area being provided in a prescribed area outside the first area so as to be adjacent to at least one lateral edge of the first area or an edge of the first area at a side remote from the vehicle,
in a case where the control device does not recognize the obstacle in the first area nor the second area, the control device moves the vehicle with a normal speed which is set for a movement toward the traveling direction,
in a case where the control device recognizes the obstacle in the first area, the control device stops the vehicle, and
in a case where the control device recognizes the obstacle in the second area and the obstacle in the second area is a moving object or a moving creature, the control device moves the vehicle in a decelerated state in which the vehicle is decelerated to a prescribed speed which is slower than the normal speed,
wherein the second area is set only when the vehicle is moving forward, and
a movement speed of the vehicle when the vehicle is moving backward during the control of the vehicle to the target position is set at the prescribed speed,
wherein after the control device recognizes the obstacle in the first area and then stops the vehicle,
in a case where the external environment sensor, which has detected the obstacle in a side area of the vehicle in the first area, no longer detects the obstacle in the first area, the control device does not allow resumption of a movement of the vehicle to the target position, and
in a case where the external environment sensor, which has detected the obstacle in an area other than the side area of the vehicle in the first area, no longer detects the obstacle in the first area, the control device allows the resumption of the movement of the vehicle to the target position.

* * * * *